(12) United States Patent
Koch et al.

(10) Patent No.: US 10,418,637 B2
(45) Date of Patent: Sep. 17, 2019

(54) GRID ARRANGEMENT FOR PLATE-SHAPED BATTERY ELECTRODE AND ACCUMULATOR

(71) Applicant: Johnson Controls Autobatterie GmbH & Co. KGaA, Hannover (DE)

(72) Inventors: Ingo Koch, Hameln (DE); Bernd Ide, Hannover (DE); Frank-Thomas Johns, Sarstedt (DE); Armin Staffeldt, Lauenbrueck (DE); Andreas Dudenbostel, Neustadt am Rbge. (DE); Dirk Goebbels, Hannover (DE); Christian Fischer, Neustadt (DE); Juergen Bauer, Hildesheim (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 300 days.

(21) Appl. No.: 15/031,344

(22) PCT Filed: Oct. 21, 2014

(86) PCT No.: PCT/EP2014/072556
§ 371 (c)(1),
(2) Date: Apr. 22, 2016

(87) PCT Pub. No.: WO2015/059146
PCT Pub. Date: Apr. 30, 2015

(65) Prior Publication Data
US 2016/0260982 A1    Sep. 8, 2016

(30) Foreign Application Priority Data

Oct. 23, 2013    (DE) .................. 10 2013 111 667

(51) Int. Cl.
*H01M 4/68*    (2006.01)
*H01M 2/16*    (2006.01)
(Continued)

(52) U.S. Cl.
CPC ............ *H01M 4/68* (2013.01); *H01M 2/1613* (2013.01); *H01M 4/73* (2013.01); *H01M 10/06* (2013.01);
(Continued)

(58) Field of Classification Search
CPC ........ H01M 2/1613; H01M 4/73; H01M 4/68; H01M 10/06; H01M 10/10
(Continued)

(56) References Cited

U.S. PATENT DOCUMENTS 669,085 A    3/1901    Heidel
1,129,690 A    2/1915    Knobloch
(Continued)

FOREIGN PATENT DOCUMENTS

CN    1279824 A    1/2001
CN    1391303 A    1/2003
(Continued)

OTHER PUBLICATIONS

Shimano, Tadakazu, Machine translation of JP 05-166512 A, Jul. 1993 (Year: 1993).*
(Continued)

*Primary Examiner* — Sean P Cullen
(74) *Attorney, Agent, or Firm* — Boardman & Clark LLP

(57) ABSTRACT

The invention relates to a grid arrangement for a plate-shaped battery electrode of an electrochemical accumulator comprising a frame and a grid arranged thereon, wherein the frame comprises at least one upper frame element having a connecting lug of the battery electrode disposed on its side facing away from the grid, wherein the grid comprises grid bars respectively surrounding cutouts of the grid, wherein the majority of the grid bars surrounding the cutouts are respectively disposed in a hexagonal arrangement such that the cutout situated in between forms a hexagon, character-
(Continued)

Figure 5:
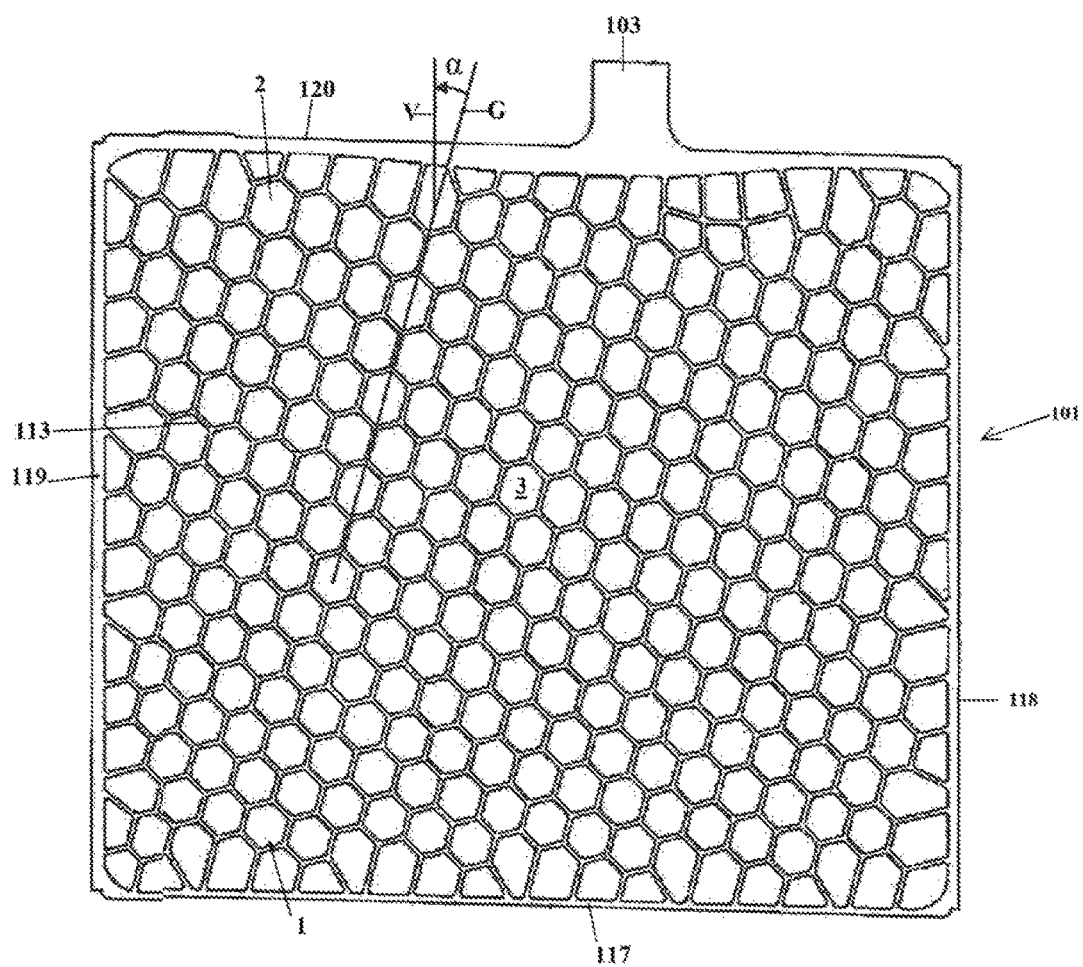

ized by one, some or all of the following a), b), c), d), e) features):

a) the grid arrangement is coated with a pasty active mass on which liquid-absorbing material designed to absorb liquid electrolyte of the accumulator is disposed,
b) the size of the hexagonal cutouts increases toward the upper frame element,
c) the grid bars of all the hexagonal cutouts have the same width or the same cross-sectional area,
d) none of the grid bars of the hexagonal cutouts run horizontal or parallel to the upper frame element,
e) none of the grid bars of the hexagonal cutouts run vertical or perpendicular to the upper frame element.

The invention further relates to an accumulator.

17 Claims, 4 Drawing Sheets

(51) Int. Cl.
  H01M 4/73 (2006.01)
  H01M 10/10 (2006.01)
  H01M 10/06 (2006.01)
  H01M 4/02 (2006.01)
(52) U.S. Cl.
  CPC ...... *H01M 10/10* (2013.01); *H01M 2004/027* (2013.01); *H01M 2004/028* (2013.01); *H01M 2300/0085* (2013.01); *Y02E 60/126* (2013.01)
(58) Field of Classification Search
  USPC .......................................................... 429/241
  See application file for complete search history.

(56) References Cited

U.S. PATENT DOCUMENTS

| | | |
|---|---|---|
| 1,347,873 A | 7/1920 | Rabe |
| 1,364,760 A | 1/1921 | Holland et al. |
| 1,381,008 A | 6/1921 | Polk |
| 1,500,219 A | 7/1924 | Benner |
| 1,524,610 A | 1/1925 | Ahlgren |
| 1,528,963 A | 3/1925 | Adams et al. |
| 1,600,083 A | 9/1926 | Webster |
| 1,675,644 A | 7/1928 | Scott et al. |
| 1,947,473 A | 2/1934 | Huebner |
| 1,983,611 A | 12/1934 | Jackson |
| 2,060,534 A | 11/1936 | Singleton et al. |
| 2,079,727 A | 5/1937 | Wirtz |
| 2,148,371 A | 2/1939 | Galloway |
| 2,193,782 A | 3/1940 | Smith |
| 2,261,053 A | 10/1941 | De Martis |
| 2,282,760 A | 4/1950 | Hauel |
| 2,503,970 A | 4/1950 | Rupp |
| 2,727,079 A | 12/1955 | Chubb et al. |
| 2,821,565 A | 1/1958 | Lander et al. |
| 2,881,105 A | 4/1959 | Gullett |
| 2,882,568 A | 4/1959 | Leaberry et al. |
| 2,882,760 A | 4/1959 | Leifer |
| 3,009,459 A | 11/1961 | Ruben |
| 3,023,468 A | 3/1962 | Hord et al. |
| 3,249,981 A | 5/1966 | Sabatino |
| 3,349,067 A | 10/1967 | Hill |
| 3,398,024 A | 8/1968 | Barnes et al. |
| 3,408,236 A | 10/1968 | Hartesveldt |
| 3,453,145 A | 7/1969 | Duddy |
| 3,466,193 A | 9/1969 | Hughel |
| 3,486,942 A | 12/1969 | Hatterschide |
| 3,534,803 A | 10/1970 | Bickerdike et al. |
| 3,556,853 A | 1/1971 | Cannone |
| 3,556,854 A | 1/1971 | Wheadon et al. |
| 3,579,386 A | 5/1971 | Tiegel et al. |
| 3,629,388 A | 12/1971 | Wolf et al. |
| 3,710,430 A | 1/1973 | Long et al. |
| 3,723,181 A | 3/1973 | Oakley |
| 3,761,047 A | 9/1973 | Mao |
| 3,779,816 A | 12/1973 | Mao |
| 3,853,626 A | 12/1974 | Daniels et al. |
| 3,909,293 A | 9/1975 | Hammond et al. |
| 3,923,545 A | 12/1975 | Margulies et al. |
| 3,926,247 A | 12/1975 | Geiger et al. |
| 3,929,513 A | 12/1975 | Mao |
| 3,933,335 A | 1/1976 | Maruyama |
| 3,933,524 A | 1/1976 | Hughel |
| 3,945,097 A | 3/1976 | Daniels, Jr. et al. |
| 3,947,936 A | 4/1976 | Wheadon |
| 3,959,016 A | 5/1976 | Tsuda |
| 3,989,539 A | 11/1976 | Grabb |
| 4,016,633 A | 4/1977 | Smith et al. |
| 4,022,951 A | 5/1977 | McDowall |
| 4,048,397 A | 9/1977 | Rothbauer |
| 4,050,502 A | 9/1977 | Allyn et al. |
| 4,080,727 A | 3/1978 | Stolle et al. |
| 4,097,625 A | 6/1978 | Lunn et al. |
| 4,107,407 A | 8/1978 | Koch |
| 4,118,553 A | 10/1978 | Buckethal et al. |
| 4,140,840 A | 2/1979 | Ruben |
| 4,151,331 A | 4/1979 | Hug et al. |
| 4,159,908 A | 7/1979 | Rao et al. |
| 4,189,533 A | 2/1980 | Sugalski |
| 4,196,757 A | 4/1980 | Hug et al. |
| 4,196,769 A | 4/1980 | Feagin |
| 4,199,849 A | 4/1980 | Moreau |
| 4,221,032 A | 9/1980 | Cousino et al. |
| 4,221,852 A | 9/1980 | Qureshi |
| 4,291,443 A | 9/1981 | Laurie et al. |
| 4,297,866 A | 11/1981 | Sakauye et al. |
| 4,303,747 A | 12/1981 | Bender |
| 4,305,187 A | 12/1981 | Iwamura et al. |
| 4,315,356 A | 2/1982 | Laurie et al. |
| 4,315,829 A | 2/1982 | Duddy et al. |
| 4,317,351 A | 3/1982 | Borrows |
| 4,320,183 A | 3/1982 | Qureshi |
| 4,327,163 A | 4/1982 | Wheadon |
| 4,345,452 A | 8/1982 | Eberle |
| 4,349,067 A | 9/1982 | Wirtz et al. |
| 4,351,891 A | 9/1982 | McCartney et al. |
| 4,353,969 A | 10/1982 | Rippel et al. |
| 4,358,892 A | 11/1982 | Turillon et al. |
| 4,386,987 A | 6/1983 | Covitch et al. |
| 4,407,063 A | 10/1983 | Johnson |
| 4,443,918 A | 4/1984 | Morinari et al. |
| 4,455,724 A | 6/1984 | Sperling et al. |
| 4,460,666 A | 7/1984 | Dinkler et al. |
| 4,462,745 A | 7/1984 | Johnson et al. |
| 4,477,546 A | 10/1984 | Wheeler et al. |
| 4,498,519 A | 2/1985 | Watanabe et al. |
| 4,528,255 A | 7/1985 | Hayes et al. |
| 4,548,882 A | 10/1985 | Shima et al. |
| 4,555,459 A | 11/1985 | Anderson et al. |
| 4,606,383 A | 8/1986 | Yanik |
| 4,614,630 A | 9/1986 | Plum |
| 4,629,516 A | 12/1986 | Myers |
| 4,683,180 A | 7/1987 | Bish et al. |
| 4,758,126 A | 7/1988 | Johnson et al. |
| 4,761,352 A | 8/1988 | Bakos et al. |
| 4,761,356 A | 8/1988 | Kobayashi et al. |
| 4,782,585 A | 11/1988 | Kobayashi et al. |
| 4,805,277 A | 2/1989 | Yasuda et al. |
| 4,822,234 A | 4/1989 | Johnson et al. |
| 4,824,307 A | 4/1989 | Johnson et al. |
| 4,830,938 A | 5/1989 | McCullough et al. |
| 4,865,928 A | 9/1989 | Richter |
| 4,865,933 A | 9/1989 | Blanyer et al. |
| 4,882,234 A | 11/1989 | Lai et al. |
| 4,882,828 A | 11/1989 | Mcloughlin et al. |
| 4,906,540 A | 3/1990 | Hoshihara et al. |
| 4,932,443 A | 6/1990 | Karolek et al. |
| 4,939,051 A | 7/1990 | Yasuda et al. |
| 4,982,482 A | 1/1991 | Wheadon et al. |
| 5,017,446 A | 5/1991 | Reichman et al. |
| 5,024,908 A | 6/1991 | Terada et al. |

(56) References Cited

U.S. PATENT DOCUMENTS

| | | |
|---|---|---|
| 5,093,970 A | 3/1992 | Senoo et al. |
| 5,098,799 A | 3/1992 | Bowen et al. |
| 5,149,605 A | 9/1992 | Dougherty |
| 5,221,852 A | 6/1993 | Nagai et al. |
| 5,223,354 A | 6/1993 | Senoo et al. |
| 5,264,306 A | 11/1993 | Walker, Jr. et al. |
| 5,273,554 A | 12/1993 | Vyas |
| 5,308,719 A | 5/1994 | Mrotek et al. |
| 5,344,727 A | 9/1994 | Meadows et al. |
| 5,350,645 A | 9/1994 | Lake et al. |
| 5,384,217 A | 1/1995 | Binder et al. |
| 5,384,219 A | 1/1995 | Dao et al. |
| 5,434,025 A | 7/1995 | Rao et al. |
| 5,462,109 A | 10/1995 | Vincze et al. |
| 5,506,062 A | 4/1996 | Flammang |
| 5,540,127 A | 7/1996 | Binder et al. |
| 5,543,250 A | 8/1996 | Yanagihara et al. |
| 5,578,398 A | 11/1996 | Jenkins et al. |
| 5,578,840 A | 11/1996 | Scepanovic et al. |
| 5,580,685 A | 12/1996 | Schenk |
| 5,582,936 A | 12/1996 | Mrotek et al. |
| 5,595,840 A | 1/1997 | Henning et al. |
| 5,601,953 A | 2/1997 | Schenk |
| 5,604,058 A | 2/1997 | Wirtz |
| 5,611,128 A | 3/1997 | Wirtz |
| 5,630,263 A * | 5/1997 | Shimano ............... B21D 31/043 29/2 |
| 5,643,696 A | 7/1997 | Rowlette |
| 5,660,600 A | 8/1997 | Vyas |
| 5,660,946 A | 8/1997 | Kump et al. |
| 5,691,087 A | 11/1997 | Rao et al. |
| 5,834,141 A | 11/1998 | Anderson et al. |
| 5,851,695 A | 12/1998 | Misra et al. |
| 5,858,575 A | 1/1999 | Chen |
| 5,874,186 A | 2/1999 | Rao et al. |
| 5,948,566 A | 9/1999 | Larsen et al. |
| 5,952,123 A | 9/1999 | Hatanaka et al. |
| 5,958,274 A | 9/1999 | Dobie et al. |
| 5,958,625 A | 9/1999 | Rao |
| 5,989,749 A | 11/1999 | Kao et al. |
| 6,026,722 A | 2/2000 | Lopez Ascaso et al. |
| 6,037,081 A | 3/2000 | Kashio et al. |
| 6,057,059 A | 5/2000 | Kwok et al. |
| RE36,734 E | 6/2000 | Binder et al. |
| 6,086,691 A | 7/2000 | Lehockey et al. |
| 6,117,594 A | 9/2000 | Taylor et al. |
| 6,122,820 A | 9/2000 | Dawood et al. |
| 6,180,286 B1 | 1/2001 | Rao et al. |
| 6,203,948 B1 | 3/2001 | Kao et al. |
| 6,245,462 B1 | 6/2001 | Kao et al. |
| 6,267,923 B1 | 7/2001 | Albert et al. |
| 6,274,274 B1 | 8/2001 | Schaeffer et al. |
| 6,291,097 B1 | 9/2001 | Barker et al. |
| 6,291,104 B1 | 9/2001 | Yoshihara et al. |
| 6,312,852 B1 | 11/2001 | Wagner |
| 6,342,110 B1 | 1/2002 | Palumbo |
| 6,348,283 B1 | 2/2002 | Mas et al. |
| 6,351,878 B1 | 3/2002 | Rao |
| RE37,804 E | 7/2002 | Mattan |
| 6,419,147 B1 | 7/2002 | Haverstick |
| 6,442,811 B1 | 9/2002 | Dawood et al. |
| 6,444,366 B1 | 9/2002 | Kawano et al. |
| 6,454,977 B1 | 9/2002 | Kwok et al. |
| 6,468,318 B1 | 10/2002 | Meadows et al. |
| 6,582,855 B1 | 6/2003 | Miyamoto et al. |
| 6,592,686 B2 | 7/2003 | Palumbo |
| 6,649,306 B2 | 11/2003 | Prengaman |
| 6,749,950 B2 | 6/2004 | Zhang |
| 6,755,874 B2 | 6/2004 | Chen et al. |
| 6,797,403 B2 | 9/2004 | Clark et al. |
| 6,833,218 B2 | 12/2004 | Mann |
| 6,921,611 B2 | 7/2005 | Schaeffer et al. |
| 6,953,641 B2 | 10/2005 | Chen |
| 7,398,581 B2 | 7/2008 | Chen |
| 7,767,347 B2 | 8/2010 | Kao et al. |
| 7,799,463 B2 | 9/2010 | Schaeffer et al. |
| 8,034,488 B2 | 10/2011 | Schaeffer et al. |
| 9,368,800 B2 | 6/2016 | Harker et al. |
| 9,577,266 B2 | 2/2017 | Troxel et al. |
| 9,761,883 B2 | 9/2017 | Taylor et al. |
| 2002/0015891 A1 | 2/2002 | Schaeffer et al. |
| 2002/0088515 A1 | 7/2002 | Aust et al. |
| 2002/0182487 A1 | 12/2002 | Wirtz |
| 2003/0059674 A1 | 3/2003 | Mann et al. |
| 2003/0096170 A1 | 5/2003 | Fujiwara et al. |
| 2004/0033157 A1 | 2/2004 | Schaeffer et al. |
| 2004/0038129 A1 | 2/2004 | Mann |
| 2004/0187986 A1 | 9/2004 | Schaeffer |
| 2005/0112470 A1 | 5/2005 | Taylor et al. |
| 2005/0150092 A1 | 7/2005 | Chen |
| 2005/0164091 A1 | 7/2005 | Schaeffer et al. |
| 2006/0213055 A1 | 9/2006 | Fujiwara et al. |
| 2007/0111089 A1 | 5/2007 | Swan |
| 2008/0289161 A1 | 11/2008 | Chen |
| 2009/0291359 A1 | 11/2009 | Wirtz et al. |
| 2010/0101078 A1* | 4/2010 | Troxel ................... H01M 4/667 29/623.1 |
| 2010/0266903 A1 | 10/2010 | Kao et al. |
| 2010/0304219 A1 | 12/2010 | Schaeffer et al. |
| 2011/0177375 A1* | 7/2011 | Pfanner ................. H01M 2/145 429/146 |
| 2012/0047719 A1 | 3/2012 | Schaeffer et al. |
| 2012/0058394 A1 | 3/2012 | Schaeffer et al. |

FOREIGN PATENT DOCUMENTS

| | | | |
|---|---|---|---|
| CN | 1391303 A * | 1/2003 | .......... H01M 2/0242 |
| CN | 1515043 A | 7/2004 | |
| CN | 1833896 A | 9/2006 | |
| CN | 101233635 A | 7/2008 | |
| CN | 201514971 U | 6/2010 | |
| CN | 201562712 U * | 8/2010 | |
| CN | 201562712 U | 8/2010 | |
| CN | 201741750 U | 2/2011 | |
| CN | 202094214 U * | 12/2011 | |
| CN | 202094214 U | 12/2011 | |
| DE | 1007835 B | 5/1957 | |
| DE | 2528688 A1 | 1/1977 | |
| DE | 8013625 U1 | 11/1980 | |
| DE | 3045683 A1 | 6/1982 | |
| DE | 3234342 A1 | 3/1984 | |
| DE | 3234342 A1 | 3/1984 | |
| DE | 102008029386 A1 | 12/2009 | |
| EP | 0029788 A1 | 6/1981 | |
| EP | 0065996 A1 | 12/1982 | |
| EP | 0348702 A1 | 1/1990 | |
| EP | 0589549 A1 | 3/1994 | |
| EP | 0795917 A2 | 9/1997 | |
| EP | 0969108 A1 | 1/2000 | |
| EP | 1041164 A1 | 10/2000 | |
| GB | 570953 A | 7/1945 | |
| GB | 724056 A | 2/1955 | |
| GB | 1376162 A | 12/1974 | |
| GB | 1377039 A | 12/1974 | |
| GB | 2127614 A | 4/1984 | |
| GB | 2127614 A * | 4/1984 | ............... H01M 4/72 |
| JP | 56-110578 | 1/1955 | |
| JP | 58-155660 | 9/1958 | |
| JP | S39-111225 | 4/1964 | |
| JP | 50028638 | 3/1975 | |
| JP | 55046267 | 3/1980 | |
| JP | 55130076 | 10/1980 | |
| JP | 55144659 | 11/1980 | |
| JP | 56032678 | 4/1981 | |
| JP | 56107474 | 8/1981 | |
| JP | 56138871 | 10/1981 | |
| JP | 56138872 | 10/1981 | |
| JP | 56165279 | 12/1981 | |
| JP | 56167271 | 12/1981 | |
| JP | 57205969 | 12/1982 | |
| JP | 58032367 | 2/1983 | |
| JP | 58066266 | 4/1983 | |
| JP | 59134563 | 8/1984 | |
| JP | 60000062 | 1/1985 | |

(56) References Cited

FOREIGN PATENT DOCUMENTS

| | | | | |
|---|---|---|---|---|
| JP | 60009061 | 1/1985 | | |
| JP | 60037663 | 2/1985 | | |
| JP | 60039766 | 3/1985 | | |
| JP | 60-78570 | 5/1985 | | |
| JP | 60143570 | 7/1985 | | |
| JP | 60-150556 | 8/1985 | | |
| JP | 60-167267 | 8/1985 | | |
| JP | 60167268 | 8/1985 | | |
| JP | 60198055 | 10/1985 | | |
| JP | 61124052 | 6/1986 | | |
| JP | S62147653 U | 7/1987 | | |
| JP | 63213264 | 9/1988 | | |
| JP | 11213993 | 8/1990 | | |
| JP | 2297864 | 12/1990 | | |
| JP | H04-196060 | 7/1992 | | |
| JP | 05166512 A | * | 7/1993 | ............ H01M 4/745 |
| JP | 07065822 | 3/1995 | | |
| JP | 60150556 | 8/1995 | | |
| JP | 08-17438 | 1/1996 | | |
| JP | 3030260 U | 2/1996 | | |
| JP | 8083617 | 3/1996 | | |
| JP | 08-213023 | 8/1996 | | |
| JP | 8287905 | 11/1996 | | |
| JP | 09-231995 | 9/1997 | | |
| JP | 10284085 | 10/1998 | | |
| JP | H1154115 | 2/1999 | | |
| JP | H11512975 A | 11/1999 | | |
| JP | 2000164223 A | 6/2000 | | |
| JP | 2000340235 A | 12/2000 | | |
| JP | 2001229920 A | 8/2001 | | |
| JP | 2001-524736 | 12/2001 | | |
| JP | 2002-260716 | 9/2002 | | |
| JP | 2003036852 A | 2/2003 | | |
| JP | 2003178760 A | 6/2003 | | |
| JP | 2004165149 A | 6/2004 | | |
| JP | 2004-521145 | 7/2004 | | |
| JP | 2004196060 A | 7/2004 | | |
| JP | 2004199951 A | 7/2004 | | |
| JP | 2004253324 A | 9/2004 | | |
| JP | 2006164668 A | 6/2006 | | |
| JP | 2006164668 A | * | 6/2006 | |
| JP | 2008542997 A | 11/2008 | | |
| JP | 2008-312381 A | 12/2008 | | |
| WO | 199927595 | 6/1999 | | |
| WO | 0104977 A1 | 1/2001 | | |
| WO | 0104978 A1 | 1/2001 | | |
| WO | 2001004977 | 1/2001 | | |
| WO | 2001053549 | 7/2001 | | |
| WO | 2002015296 | 2/2002 | | |
| WO | 2002054513 | 7/2002 | | |
| WO | 2006127575 A1 | 11/2006 | | |
| WO | 2008109429 A2 | 9/2008 | | |
| WO | 2009150485 A1 | 12/2009 | | |
| WO | 2011/130514 A1 | 10/2011 | | |
| WO | 2011130514 A1 | 10/2011 | | |

OTHER PUBLICATIONS

International Search Report and Written Opinion of the International Searching Authority, dated Mar. 26, 2015 for PCT/EP2014/072556 filed Oct. 21, 2014.
International Preliminary Report on Patentability and Written Opinion of the International Searching Authority dated May 5, 2016, for PCT/EP2014/072556 filed Oct. 21, 2014, 15 pages (English translation).
Amendment and Response dated Dec. 30, 2009. from U.S. Appl. No. 11/984,666.
Chinese Patent Office, Office Action (w/English Translation) dated Jul. 6, 2009, for Chinese Patent Appln. No. 200680017715.1 based on PCT/US06/19686, 12 pp.
U.S. Appl. No. 09/898,660 titled "Modification of the Shape/Surface/Finish of Battery Grid Wires to Improve Paste Adhesion", by Schaeffer et al., filed Jul. 2, 2001.
Final Office Action dated May 19, 2004 from U.S. Appl. No. 09/755,337.
International Search Report and Written Opinion dated Jul. 1, 2011, for PCT/US11/026836.
International Search Report and Written Opinion dated Jul. 24, 2013, for PCT/US12/62698 filed Oct. 31, 2012.
International Search Report and Written Opinion dated Oct. 5, 2006 for PCT/US06/19686, 2 pp.
International Search Report dated Aug. 11, 2000, for PCT/US00/12569.
International Search Report dated Aug. 19, 2002, for PCT/US02/00390, 7 pages.
International Search Report dated Mar. 11, 1999, for PCT/US98/24345, filed Mar. 3, 1999, 2 pp.
International Search Report Report dated Oct. 12, 2000 for PCT/US00/18313.
International Search Report dated Oct. 6, 1999, for PCT/US99/13291.
International Search Report dated Oct. 9, 2000, for PCT/US00/18144.
Non-final Office Action dated Nov. 19, 2003, from U.S. Appl. No. 09/755,337.
Office Action dated Aug. 5, 2009 (w/English Translation), for Chinese Patent Appln. No. 20060017715.1.
Office Action dated Jan. 19, 2010, from Brazil Patent Application No. PI 0206343-3 (w/English Translation).
Office Action dated Jan. 21, 2009, for EPO Appln No. 06770804.0-2119, 3 pp.
Office Action dated Jan. 7, 2003 for U.S. Appl. No. 09/755,337.
Office Action dated Jun. 18 2003 for U.S. Appl. No. 09/755,337.
Office Action dated Mar. 24, 2003 for U.S. Appl. No. 09/898,660.
Office Action dated May 1, 2003 for U.S. Appl. No. 09/898,660.
Office Action dated Sep. 16, 2002, for U.S. Appl. No. 09/755,337.
Office Action dated Sep. 30, 2009, from U.S. Appl. No. 11/984,666.
Patent Abstract for AU 275685.
Reply and Amendment dated Feb. 12, 2004 from from U.S. Appl. No. 09/755,377.
Reply and Amendment dated Jul. 19, 2004 from U.S. Appl. No. 09/755,337.
Response dated May 28, 2009 to Office Action for EPO Appln. No. 067707804.0-2119, 9 pp.
Response dated Oct. 28, 2008 to Office Action for EPO Appln. No. 06770804.0-2119, 5 pp.
Response dated Sep. 23, 2009, for Chinese Patent Appln. No. 20060017715.1.
Chen, Yu-Lin, "Method for Making an Alloy Coated Battery Grid", U.S. Appl. No. 09/755,337.
Goodman, S. , "Plates with improved conductivity", Batteries International, pp. 88-89 (no month).
Ishikawa, et al., "A punched grid production process for automotive batteries", PB 80, 7th International Conference (1980).
Megger, "Failure Modes—Lead Acid (flooded) failure modes", Battery Testing Guide, p. 7.
Perez, "The Complete Battery Book", TAB Books, Inc., 191 pp., 1985 (no month).
www.fireflyenergy.com "Traditional Lead Acid Battery Shortcomings".
International Search Report and Written Opinion of the International Searching Authority dated Dec. 18, 2014 for PCT/EP2014/071556 filed Oct. 8, 2014, 13 pages.
International Search Report and Written Opinion of the International Searching Authority dated Mar. 26, 2015 for PCT/EP2014/072556 filed Oct. 21, 2014, 16 pages.
Office Action dated Apr. 23, 2008 for EP Appln. No. 06770804.0-2119, 5 pages.

* cited by examiner

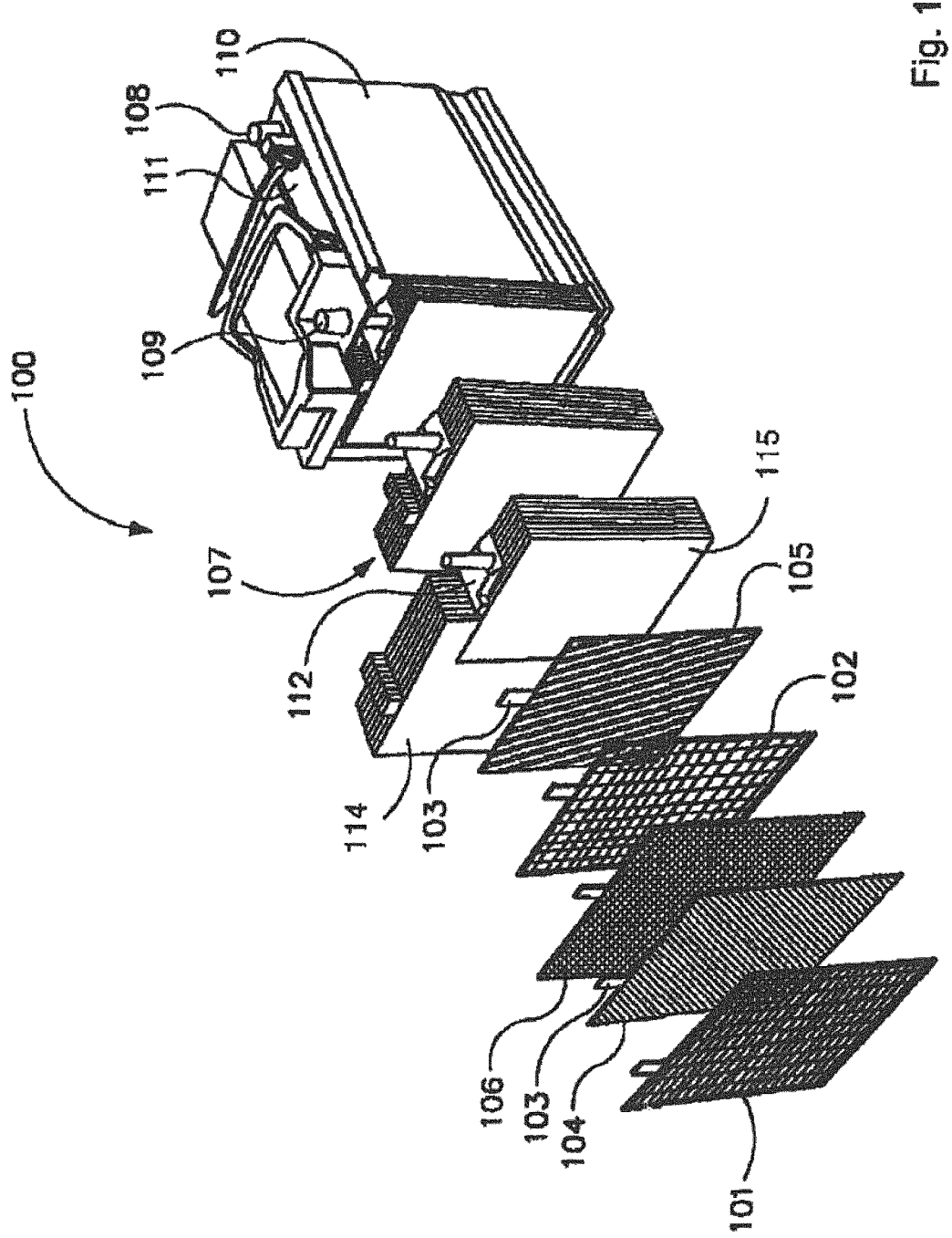

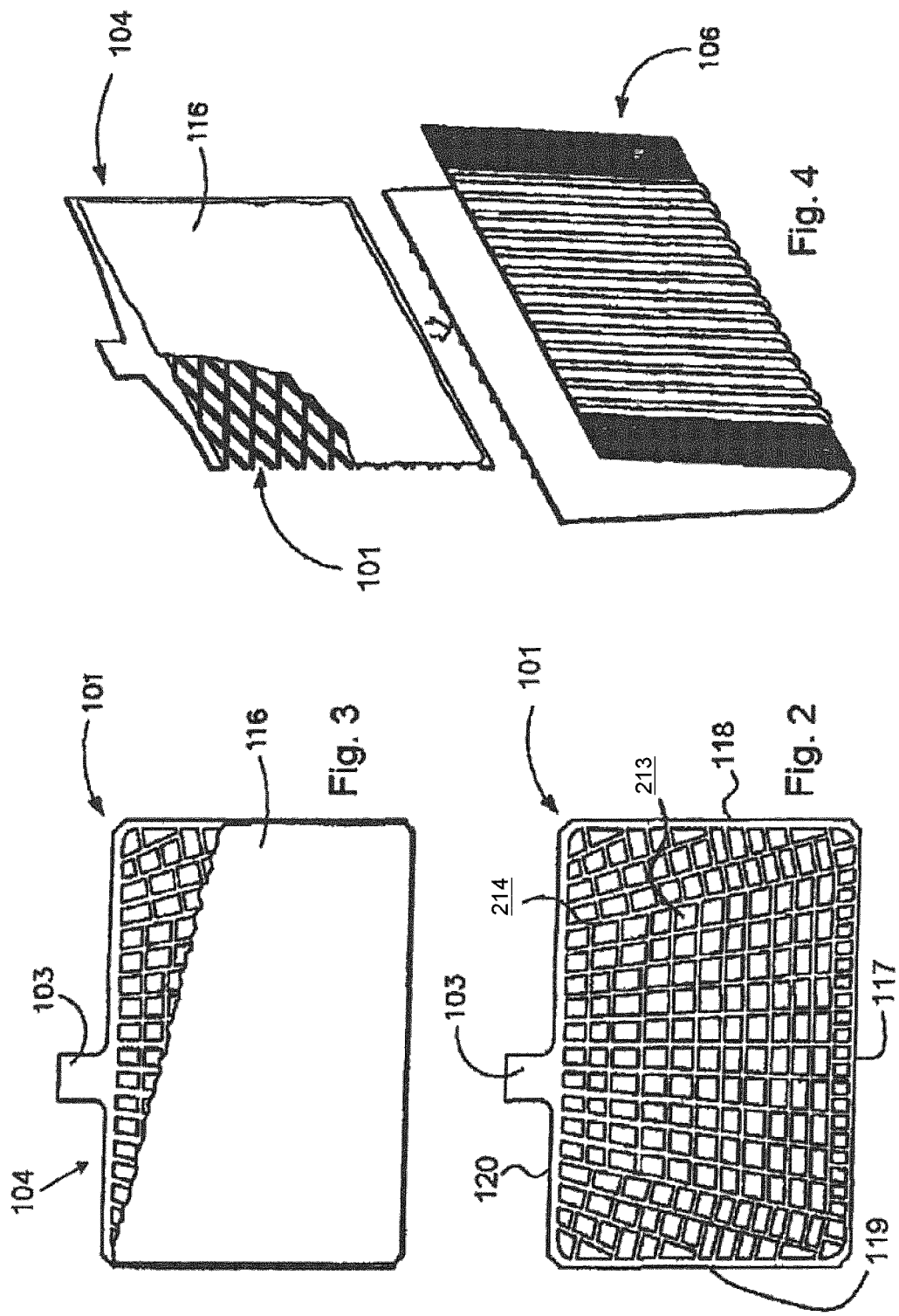

GRID ARRANGEMENT FOR PLATE-SHAPED BATTERY ELECTRODE AND ACCUMULATOR

The invention relates to a grid arrangement for a plate-shaped battery electrode of an electrochemical accumulator in accordance with the preamble of claim 1. The invention further relates to an accumulator in accordance with claim 12.

Generally speaking, the invention relates to the field of electrochemical accumulators having plate-shaped battery electrodes, also known as electrode plates. Such accumulators are particularly manufactured as lead-acid batteries. Grid arrangements for such accumulators are described for example in DE 10 2008 029 386 A1 and WO 01/04977 A1. Such grid arrangements are usually made of lead. Due to rising raw material prices and with the objective of reducing the weight of electrochemical accumulators, minimizing the amount of lead used is desirable.

The invention is thus based on the task of specifying an optimized grid arrangement with which the amount of lead needed can be reduced without impairing an accumulator's electrical performance. An accumulator for this purpose is further to be specified.

This task is solved in accordance with claim 1 by a grid arrangement for a plate-shaped battery electrode of an electrochemical accumulator comprising a frame and a grid arranged thereon, wherein the frame comprises at least one upper frame element having a connecting lug of the battery electrode disposed on its side facing away from the grid, wherein the grid comprises grid bars respectively surrounding cutouts of the grid, wherein the majority of the grid bars surrounding the cutouts are respectively disposed in a hexagonal arrangement such that the cutout situated in between forms a hexagon, characterized by one, some or all of the following a), b), c), d), e) features:
a) the grid arrangement is coated with a pasty active mass on which liquid-absorbing material designed to absorb liquid electrolyte of the accumulator is disposed,
b) the size of the hexagonal cutouts increases toward the upper frame element,
c) the grid bars of all the hexagonal cutouts have the same width or the same cross-sectional area,
d) none of the grid bars of the hexagonal cutouts run horizontal or parallel to the upper frame element,
e) none of the grid bars of the hexagonal cutouts run vertical or perpendicular to the upper frame element.

The invention has the advantage of the grid arrangement enabling the production of accumulators which exhibit better electrical performance data. Particularly the cyclic stability of the accumulator can thus be increased. The improved grid arrangement also benefits the voltage curve, capacity and internal resistance of the accumulator.

In accordance with feature a), the grid arrangement is coated with a pasty active mass on which a liquid-absorbing material designed to absorb liquid electrolyte of the accumulator is disposed. In combination with the hexagon arrangement and the grid bars, or hexagonal cutouts respectively, a particularly efficient accumulator can be produced, particularly an AGM accumulator, which exhibits all the advantages inherent to this type of accumulator as well as a comparatively higher mechanical loading capability while making use of a lesser amount of lead. AGM hereby stands for Absorbed Glass Mat. The liquid-absorbing material can thus be designed for example as a microglass mat separator or other absorbent glass fiber mat.

In accordance with feature b), the size of the hexagonal cutouts increases toward the upper frame element. In other words, the hexagonal cutouts disposed farther from the upper frame element are smaller than the hexagonal cutouts disposed closer to the upper frame element. The size of the cutouts can in particular be defined by their surface area. One advantage thereby in terms of the electrical requirements is a more homogeneous distribution to the active mass provided for the grid arrangement than in known grid arrangements. Thus, more active mass can be accommodated per hexagonal cutout close to the upper frame element than is the case with hexagonal cutouts disposed farther away from the upper frame element. Simulations and tests have shown that the grid and a battery electrode formed with it thereby exhibit particularly homogeneous electrical characteristics.

According to feature c), the grid bars of all the hexagonal cutouts have the same width or the same cross-sectional area. This has the advantage of promoting a uniform distribution of current flow through the grid bars.

According to feature d), none of the grid bars of the hexagonal cutouts run horizontally. It can be also provided for none of the grid bars of the hexagonal cutouts to run parallel to the upper frame element. Insofar as the usage of terms such as horizontally, vertically, above, below and/or horizontal or perpendicular, these terms refer to the mounting orientation of the battery electrode in an electrochemical accumulator when in normal position for specification-compliant use. As a rule, the specification-compliant normal position of the accumulator is with the bottom of the accumulator being in a horizontal position. The upper frame element is thereby generally likewise in a horizontal orientation. The cited feature has the advantage of being able to particularly efficiently introduce the active mass into the cutouts and being able to prevent or at least significantly reduce so-called "paste shadows." Paste shadows appear on the rear side of grid bars in the direction of coating when the pasty active mass is being applied to the cutouts.

According to feature e), none of the grid bars of the hexagonal cutouts run vertically. It can be also provided for none of the grid bars of the hexagonal cutouts to run perpendicular to the upper frame element. This likewise has the advantage of being able to particularly efficiently introduce the active mass into the cutouts and being able to prevent or at least considerably reduce paste shadows.

According to one advantageous further development of the invention, the grid bars of the hexagonal cutouts form a honeycomb grid structure.

According to one advantageous further development of the invention, the grid arrangement is designed as a positive grid arrangement for a positive battery electrode. According to one advantageous further development of the invention, the grid arrangement is a stamped lead grid.

The grid arrangement comprises at least the upper frame element. The grid arrangement can additionally comprise a lower frame element, a left and a right side frame element, wherein the upper frame element is connected to the lower frame element by means of the left and right side frame elements. The grid is thereby arranged within the frame. Doing so provides a grid arrangement of increased robustness even in its lower regions.

According to one advantageous further development of the invention, the majority of the angles between two connected grid bars is greater than 90°. This is likewise advantageous to introducing pasty active mass into the cutouts. Insofar as angles are specified in ° (degrees) in this application, they relate to a full circle of 360°.

According to one advantageous further development of the invention, at least some of the hexagonal cutouts are delimited by six grid bars, of which four grid bars are of the same length and two grid bars are of a different length than the four grid bars of the same length. This enables the realizing of an elongated or "stretched" hexagonal arrangement.

According to one advantageous further development of the invention, the four grid bars of the same length are connected together at connecting points into respective pairs. The pairs thereby formed are connected together by the two grid bars of the other length.

According to one advantageous further development of the invention, a straight line extending through the connecting points is at an angle of 5° to 25°, particularly 10° to 20°, to vertical. So doing enables a type of sideways inclined or tilted hexagonal grid to be formed, which has the advantage of the tilting predominantly orientating the grid bars in the direction of the current flow to the connecting lug and thereby further improving the electrical properties of the grid arrangement.

According to one advantageous further development of the invention, the length of the two grid bars of differing length increases toward the upper frame element. This thus enables for example the realizing of feature b) of claim 1. Alternatively, the size of the cutouts can also be increased toward the upper frame element in a different way, e.g. by increasing the cutout's area by increasing the length of all the grid bars surrounding the cutout.

According to one advantageous further development of the invention, the length of the four grid bars of the same length remains the same toward the upper frame element. In other words, the length of these four grid bars is unchanged over the vertical extension of the grid arrangement.

According to one advantageous further development of the invention, the size of the hexagonal cutouts increases toward the upper frame element from an initial value of 35 to 45 mm$^2$ to a terminal value of 53 to 63 mm$^2$. This has the advantage of realizing relatively small cutouts which in turn increases an accumulator's performance. The relatively small cutouts are advantageous in reducing the effect of active mass shrinkage upon setting and in making better utilization of the active mass.

The task cited at the outset is additionally solved according to claim 12 by an accumulator having a plurality of plate-shaped battery electrodes arranged into one or more electrode plate packs, wherein one, some or all of the battery electrodes comprise(s) a grid arrangement of the above-described type.

According to one advantageous further development of the invention, the accumulator is filled with liquid electrolyte. A liquid-absorbing material which absorbs liquid electrolyte is disposed between the battery electrodes. The liquid-absorbing material can be disposed between all or between only some of the battery electrodes. Each second battery electrode can thus be wrapped in the liquid-absorbing material, for example. The accumulator can in particular be an AGM accumulator.

The following will reference the drawings in describing the invention in greater detail by way of embodiments.

Shown are:

FIG. 1: a semi-exploded view of an accumulator and its structural elements;

FIG. 2: a grid arrangement;

FIG. 3: a grid arrangement provided with an active mass;

FIG. 4: the encasing of a grid arrangement provided with an active mass within a separator;

FIG. 5: a top view of the grid arrangement according to the invention; and

Figure 6:
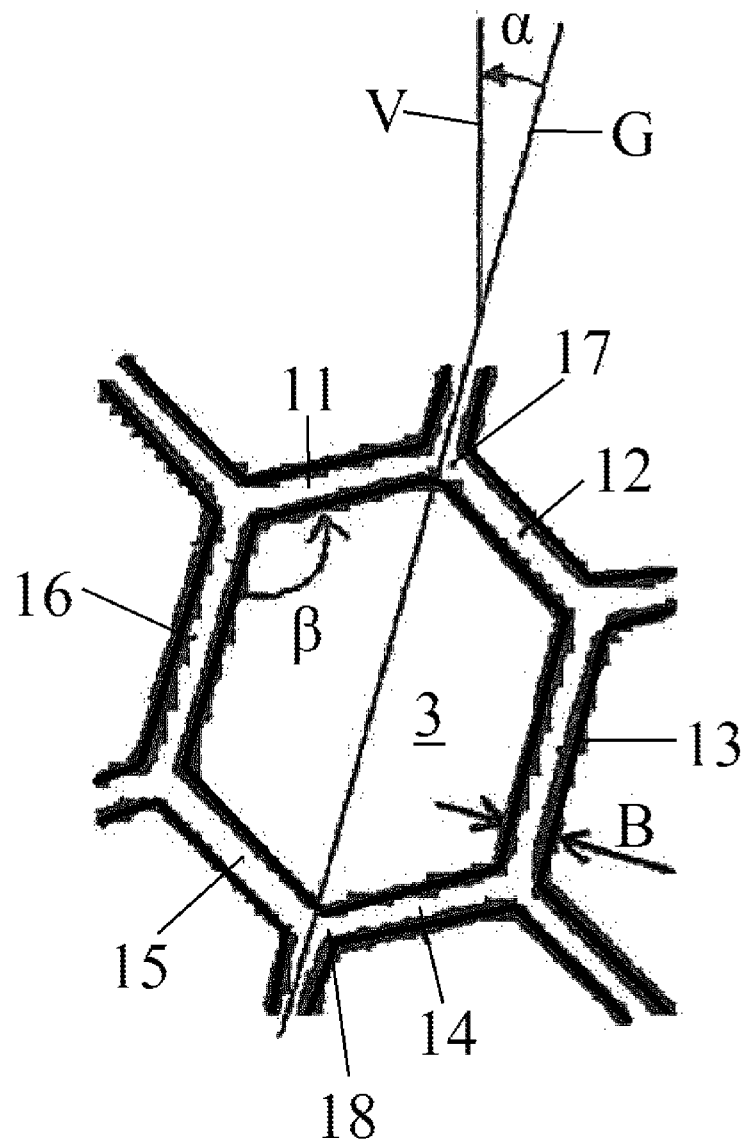

FIG. 6: an enlarged detail view of the grid arrangement according to FIG. 5.

The figures make use of the same reference numerals for equivalent elements.

FIG. 1 initially illustrates an example basic design of an accumulator 100 according to the invention. The accumulator 100 can in particular be designed as a lead-acid battery having liquid electrolyte, for example in the form of sulfuric acid. The accumulator 100 has a housing 110 in which or more or more plate packs 107 are arranged. The accumulator 100 has a fixed number of plate packs 107 based on its number of cells. The plate packs 107 are respectively arranged in individual holding chambers of the housing 110 separated from one another by partitions. The plate packs 107 are connected together into a series connection within the housing 110 by internal connecting elements not depicted in FIG. 1. The positive plates at the one end of the plate pack and the negative plates at the other end of the plate pack are electrically connected to respective external terminals 108, 109 located in a cover part 111 of the accumulator housing 110. The electrical energy of the accumulator 100 is supplied to electrical loads through terminals 108, 109.

The plate packs 107 comprise respectively alternating positive and negative electrode plates. The negative electrode plates are depicted as negative plate group 115, the positive electrode plates as positive plate group 114. FIG. 1 includes a depiction of individual electrode plates for illustrative purposes; i.e. a negative electrode plate 105 comprising a negative flat lead grid 102 and a positive electrode plate 104 comprising a positive flat lead grid 101. The positive electrode plate 104 and the negative electrode plate 105 depicted in FIG. 1 already exhibit an active mass pasting, same covering the individual grid bars and cutouts. The positive and/or negative lead grid comprise(s) a plurality of grid bars and a plurality of window-like cutouts formed between the grid bars. The positive and/or negative lead grid 101, 102 can be produced for example in a stamping process or by means of other methods such as casting and/or rolling.

The positive electrode plate 104 is additionally separated from the negative electrode plate 105 by a separator material 106. The separator material 106 can in particular be formed into the shape of a pouch to accommodate the positive electrode plate 104 and separate it from adjacent electrode plates. The positive electrode plates 104 each comprise a respective connecting lug 103 by means of which the electrode plates in the positive plate group 114 are connected together into a parallel connection. The negative electrode plates 105 each comprise a respective connecting lug 103 by means of which the electrode plates in the negative plate group 115 are connected together into a parallel connection. The connection can be made by a connector 112 soldered or welded onto the connecting lugs 103 as is recognizable in FIG. 1.

The accumulator 100 according to FIG. 1 can in particular comprise one or more inventive electrode plates, e.g. in the form of positive electrode plates 104.

FIG. 2 shows an example of a positive lead grid 101 in a top plan view. It can be seen that the lead grid 101 has a plurality of grid bars 214, between which is a plurality of window-like cutouts 213. To make it easier to handle and for purposes of mechanical stability as well as improved electrical properties, the outer edge of the lead grid 101 can exhibit one, some or all of the following cited frame sections: upper frame section 120, left side frame section 119, lower frame section 117, right side frame section 118.

FIG. 3 shows the lead grid 101 from FIG. 2 after having been at least partly covered with active mass 116, which is usually applied in paste form. This process is also known as pasting. FIG. 4 shows the lead grid 101 of FIG. 3 having been provided with the active mass 116 being inserted into a wrapper-like separator 106.

FIG. 5 shows a grid arrangement 101 formed according to the invention, again comprising a frame having an upper frame element 120, a lower frame element 117, a right side frame element 118 and a left side frame element 119. The grid 113 is situated within the area enclosed by the above-cited frame elements. The grid 113 comprises various cutouts enclosed by grid bars. The majority of the cutouts are hexagonal such as e.g. cutouts 1, 2, 3 exemplarily provided with reference numerals. The area of the grid 113 formed by hexagonal cutouts ends as it were at the transition to the frame elements 117, 118, 119, 120. As can further be seen, the size of the cutouts increases from the bottom, e.g. from cutout 1, up to the upper frame element 120, as is evident by comparing cutout 1 to cutout 2. The cutouts as well as the grid bars surrounding them are arranged in a type of honeycomb structure. The honeycomb structure is thereby not aligned with specific grid bars exactly parallel to one of the frame elements 117, 118, 119, 120 but rather the entire honeycomb structure is so to speak tilted somewhat to the right. This is clear from straight line G as shown in FIG. 5, which is slanted by an angle α corresponding to the tilt angle relative to vertical V.

This is clarified in the following using FIG. 6, which shows an enlarged illustration of the cutout 3 and its surrounding grid bars serving as an example for all of the hexagonal cutouts. Again recognizable is the straight line G which is slanted relative to the vertical V by angle α.

The cutout 3 is enclosed by the grid bars 11, 12, 13, 14, 15, 16. Grid bars 11, 12, 14, 15 hereby have the same length. Grid bars 11, 12 are connected together at an upper connecting point 17, grid bars 14, 15 are connected together at a lower connecting point 18. The straight line G runs through the connecting points 17, 18. Angle β is provided between grid bar 11 and grid bar 16. Grid bar 13 has a thickness B.

Grid bars 13, 16 have in each case the same length. The length of grid bars 13, 16 can be identical to the length of grid bars 11, 12, 14, 15, although various cutouts have a different length in the inventive grid arrangement. In particular, the length of grid bars 13, 16 in the proximity of the lower frame element 117 can be shorter or equal to the length of grid bars 11, 12, 14, 15. The length of grid bars 13, 16 increases toward the upper frame element 120 and is equal to or longer than the length of grid bars 11, 12, 14, 15 in the proximity of the upper frame element 120.

In terms of their area, the size of the cutouts can increase in the upward direction; i.e. toward the upper frame element 120, by a value ranging from for example 35 to 45 mm$^2$, e.g. 40 mm$^2$, at cutout 1 to a value ranging from 53 to 63 mm$^2$, particularly 58 mm$^2$, at cutout 2.

The invention claimed is:

1. A grid arrangement (101, 102) for a plate-shaped battery electrode (104, 105) of an electrochemical accumulator (100), comprising a frame (117, 118, 119, 120) and a grid (113) arranged thereon, wherein the frame (117, 118, 119, 120) comprises at least one upper frame element (120) having a connecting lug (103) of the battery electrode (104, 105) disposed on a side facing away from the grid (113), wherein the grid (113) comprises grid bars (11 to 16) respectively surrounding cutouts (1, 2, 3) of the grid (113), wherein the majority of the grid bars (11 to 16) surrounding the cutouts (1, 2, 3) are respectively disposed in a hexagonal arrangement such that the cutout (1, 2, 3) situated in between forms a hexagon, characterized by the following features:
none of the grid bars (11 to 16) of the hexagonal cutouts (1, 2, 3) run parallel to the upper frame element (120);
none of the grid bars (11 to 16) of the hexagonal cutouts (1, 2, 3) run perpendicular to the upper frame element (120): and
wherein the grid arrangement (101, 102) is a stamped lead grid.

2. The grid arrangement according to claim 1, characterized in that the grid arrangement (101, 102) is designed as a positive grid arrangement for a positive battery electrode (104, 105).

3. The grid arrangement according to claim 1, characterized in that the frame (117, 118, 119, 120) comprises the upper frame element (120), a lower frame element (117), a left and a right side frame element (118, 119), wherein the upper frame element (120) is connected to the lower frame element (117) by means of the left and right side frame elements (118, 119), wherein the grid (113) is arranged within the frame (117, 118, 119, 120).

4. The grid arrangement according to claim 1, characterized in that the majority of the angles (ß) between two connected grid bars (11 to 16) is greater than 90°.

5. The grid arrangement according to claim 1, characterized in that the size of the hexagonal cutouts (1, 2, 3) increases toward the upper frame element (120) from an initial value in the range of 35 to 45 mm$^2$ to a terminal value in the range of 53 to 63 mm$^2$.

6. The grid arrangement according to claim 1, characterized in that the size of the hexagonal cutouts (1, 2, 3) increases toward the upper frame element (120).

7. The grid arrangement according to claim 1, characterized in that the grid bars of all the hexagonal cutouts (1, 2, 3) have the same width (B) or the same cross-sectional area.

8. The grid arrangement according to claim 1, characterized in that at least some of the hexagonal cutouts (1, 2, 3) are delimited by 6 grid bars (11 to 16), of which 4 grid bars (11, 12, 14, 15) are of the same length and 2 grid bars (13, 16) are of a different length than the 4 grid bars (11, 12, 14, 15) of the same length.

9. The grid arrangement according to claim 8, characterized in that the length of the 2 grid bars (13, 16) of a different length increases toward the upper frame element (120).

10. The grid arrangement according to claim 8, characterized in that the length of the 4 grid bars (11, 12, 14, 15) of the same length remains the same toward the upper frame element (120).

11. The grid arrangement according to claim 8, characterized in that the 4 grid bars (11, 12, 14, 15) of the same length are connected together at connecting points (17, 18) into respective pairs and the pairs thereby formed are connected together by the 2 grid bars (13, 16) of the other length.

12. The grid arrangement according to claim 11, characterized in that a straight line (G) extending through the connecting points (17, 18) is at an angle (α) of 5° to 25° to vertical (V), vertical (V) being defined as perpendicular to the upper frame element (120).

13. The grid arrangement according to claim 12, characterized in that the straight line (G) extending through the connecting points (17, 18) is at an angle (α) of 10° to 20° to the vertical (V).

14. A grid arrangement (101, 102) for a plate-shaped battery electrode (104, 105) of an electrochemical accumulator (100), comprising a frame (117, 118, 119, 120) and a grid (113) arranged thereon, wherein the frame (117, 118, 119, 120) comprises at least one upper frame element (120) having a connecting lug (103) of the battery electrode (104, 105) disposed on a side facing away from the grid (113), wherein the grid (113) comprises grid bars (11 to 16) respectively surrounding cutouts (1, 2, 3) of the grid (113), wherein the majority of the grid bars (11 to 16) surrounding the cutouts (1, 2, 3) are respectively disposed in a hexagonal arrangement such that the cutout (1, 2, 3) situated in between forms a hexagon, characterized by the following features:

- none of the grid bars (11 to 16) of the hexagonal cutouts (1, 2, 3) run parallel to the upper frame element (120);
- none of the grid bars (11 to 16) of the hexagonal cutouts (1, 2, 3) run perpendicular to the upper frame element (120); and
- four grid bars (11, 12, 14, 15) of the same length are connected together at connecting points (17, 18) into respective pairs and the pairs thereby formed are connected together by the two grid bars (13, 16) of a different length, wherein a straight line (G) extending through the connecting points (17, 18) is at an angle ($\alpha$) of 5° to 25° to vertical (V), vertical (V) being defined as perpendicular to the upper frame element.

15. An accumulator (100) having a plurality of plate-shaped battery electrodes (104, 105) arranged into one or more electrode plate packs (107), wherein one, some or all of the battery electrodes (104, 105) comprise(s) a grid arrangement (101, 102) which comprises a frame (117, 118, 119, 120) and a grid (113) arranged thereon, wherein the frame (117, 118, 119, 120) comprises at least one upper frame element (120) having a connecting lug (103) of the battery electrode (104, 105) disposed on a side facing away from the grid (113), wherein the grid (113) comprises grid bars (11 to 16) respectively surrounding cutouts (1, 2, 3) of the grid (113), wherein the majority of the grid bars (11 to 16) surrounding the cutouts (1, 2, 3) are respectively disposed in a hexagonal arrangement such that the cutout (1, 2, 3) situated in between forms a hexagon, characterized by the following features:

- none of the grid bars (11 to 16) of the hexagonal cutouts (1, 2, 3) run parallel to the upper frame element (120);
- none of the grid bars (11 to 16) of the hexagonal cutouts (1, 2, 3) run perpendicular to the upper frame element (120); and
- wherein the grid arrangement (101, 102) is a stamped lead grid.

16. The accumulator according to claim 15, characterized in that the accumulator (100) is filled with liquid electrolyte and liquid-absorbing material (106) which absorbs the liquid electrolyte is disposed between the battery electrodes (104, 105).

17. The accumulator according to claim 15, characterized in that the grid (113) is coated with a pasty active mass (116) on which liquid-absorbing material (106) designed to absorb liquid electrolyte of the accumulator (100) is configured to be disposed.

* * * * *